US008495571B2

(12) United States Patent
Wall et al.

(10) Patent No.: US 8,495,571 B2
(45) Date of Patent: Jul. 23, 2013

(54) COMPUTER METHOD AND APPARATUS FOR ENGINEERED PRODUCT MANAGEMENT INCLUDING SIMULTANEOUS INDICATION OF WORKING COPY STATUS AND REPOSITORY STATUS

(75) Inventors: Matthew B. Wall, Cambridge, MA (US); Timothy R. Wall, Cambridge, MA (US); Andrew Aucott, Eaglescliffe (GB)

(73) Assignee: Oculus Technologies Corporation, Boston, MA (US)

( * ) Notice: Subject to any disclaimer, the term of this patent is extended or adjusted under 35 U.S.C. 154(b) by 1080 days.

(21) Appl. No.: 11/975,763

(22) Filed: Oct. 22, 2007

(65) Prior Publication Data

US 2009/0083165 A1 Mar. 26, 2009

Related U.S. Application Data

(60) Provisional application No. 60/994,720, filed on Sep. 21, 2007.

(51) Int. Cl.
  *G06F 9/44* (2006.01)
  *G06F 17/28* (2006.01)
  *G06F 17/30* (2006.01)

(52) U.S. Cl.
  USPC .......................... 717/122; 715/229; 707/687

(58) Field of Classification Search
  None
  See application file for complete search history.

(56) References Cited

U.S. PATENT DOCUMENTS

| | | | | |
|---|---|---|---|---|
| 5,649,200 A | * | 7/1997 | Leblang et al. | 717/122 |
| 6,112,024 A | * | 8/2000 | Almond et al. | 717/122 |
| 6,223,343 B1 | * | 4/2001 | Hopwood et al. | 717/122 |
| 6,460,052 B1 | * | 10/2002 | Thomas et al. | 707/695 |
| 6,564,246 B1 | | 5/2003 | Varma et al. | |
| 6,564,370 B1 | * | 5/2003 | Hunt | 717/122 |
| 6,601,233 B1 | | 7/2003 | Underwood | |
| 6,636,242 B2 | | 10/2003 | Bowman-Amuah | |
| 6,993,759 B2 | * | 1/2006 | Aptus et al. | 715/229 |

(Continued)

OTHER PUBLICATIONS

Stefan Kung, et al., "TortoiseSVN A Subversion client for Windows Version 1.3.5", Sep. 26, 2006 online publish, [retrieved on Mar. 16, 2011], Retrieved from the Internet<URL:http://sourceforge.net/projects/tortoisesvn/files/Documentation/1.3.5/>, pp. 1-136.*

(Continued)

*Primary Examiner* — Thuy Dao
*Assistant Examiner* — Xi D Chen
(74) *Attorney, Agent, or Firm* — Hamilton, Brook, Smith & Reynolds, P.C.

(57) ABSTRACT

A computer method and apparatus for managing revisions to engineered products includes a repository, a local data store (working copy) and a revision manager. Each engineered product is formed of one or more assets. The repository holds the plurality of assets and tracks changes of the assets. For a given asset, the revision manager provides, together in a certain screen view, display of (a) indications of changes made to a working copy of the given asset relative to the given asset as held in the repository, and (b) indications of changes made to the given asset in the repository relative to the working copy of the given asset. The certain screen view in one embodiment employs a tabular format with sortable columns, color coded symbols, textual summaries of changes made to assets and textual description of changes made to assets in the repository.

17 Claims, 6 Drawing Sheets

U.S. PATENT DOCUMENTS

| | | | |
|---|---|---|---|
| 7,171,618 B2 * | 1/2007 | Harrington et al. | 715/229 |
| 7,266,767 B2 * | 9/2007 | Parker | 715/229 |
| 7,299,450 B2 | 11/2007 | Livshits et al. | |
| 7,353,232 B1 * | 4/2008 | Kalucha et al. | 705/64 |
| 7,401,031 B2 | 7/2008 | Hughes | |
| 7,478,362 B2 | 1/2009 | Gutz et al. | |
| 7,614,038 B2 * | 11/2009 | Poole | 715/229 |
| 7,788,295 B2 | 8/2010 | Wall et al. | |
| 7,818,663 B2 * | 10/2010 | Khaba | 715/229 |
| 7,818,740 B2 * | 10/2010 | Bankston et al. | 717/122 |
| 7,823,057 B1 * | 10/2010 | Schultz et al. | 715/229 |
| 7,853,947 B2 * | 12/2010 | Laborczfalvi et al. | 707/687 |
| 7,904,885 B2 * | 3/2011 | Volkmer | 717/120 |
| 7,953,847 B2 | 5/2011 | Grelewicz et al. | |
| 8,010,507 B2 * | 8/2011 | Poston et al. | 707/687 |
| 8,037,452 B2 * | 10/2011 | Minium et al. | 717/122 |
| 8,051,047 B2 * | 11/2011 | Takahashi | 707/687 |
| 8,176,002 B2 * | 5/2012 | Murphy et al. | 707/687 |
| 8,296,169 B2 | 10/2012 | Wall et al. | |
| 8,335,775 B1 * | 12/2012 | Sedlar et al. | 715/229 |
| 8,423,390 B2 | 4/2013 | Wall et al. | |
| 2002/0118222 A1 | 8/2002 | Fogarty | |
| 2002/0188597 A1 | 12/2002 | Kern et al. | |
| 2003/0172368 A1 | 9/2003 | Alumbaugh et al. | |
| 2004/0117759 A1 | 6/2004 | Rippert et al. | |
| 2005/0114829 A1 | 5/2005 | Robin et al. | |
| 2005/0138150 A1 | 6/2005 | Bhaskcr et al. | |
| 2005/0228829 A1 | 10/2005 | Richards et al. | |
| 2006/0235732 A1 | 10/2006 | Miller et al. | |
| 2007/0220479 A1 | 9/2007 | Hughes | |
| 2008/0034013 A1 | 2/2008 | Cisler et al. | |
| 2008/0313596 A1 | 12/2008 | Kreamer et al. | |
| 2009/0083101 A1 | 3/2009 | Wall et al. | |
| 2009/0083102 A1 | 3/2009 | Wall et al. | |
| 2009/0083343 A1 | 3/2009 | Wall et al. | |
| 2011/0125718 A1 * | 5/2011 | Wilson | 707/687 |

OTHER PUBLICATIONS

William Nagel, "Subversion Version Control: Using the Subversion Version Control System in Development Projects", May 16, 2005, Prentice Hall, [retrieved on Mar. 16, 2011], Retrieved from the Internet <URL:http://academic.safaribooksonline.com/0131855182>, pp. 1-26.*

Servant, et al., "CASI: Preventing Indirect Conflicts through a Live Visualizaiton"; 2010 ACM; [retrieved on Apr. 5, 2013]; Retrieved from Internet <URL:http://dl.acm.org/citation.cfm?id=1833310>; pp. 39-46.*

Roshandel, Hoek, "Mae—A System Model and Environment for Managing Architectural Evolution"; 2004 ACM; [retrieved on Apr. 5, 2013]; Retrieved from Internet <URL:http://dl.acm.org/citation.cfm?id=1018210>; pp. 240-276.*

Chou, Kim, "Versions and Change Notification in an Object-Oriented Database System"; 1988 IEEE; [retrieved on Apr. 5, 2013]; Retrieved from Internet <URL:http://ieeexplore.ieee.org/stamp/stamp.jsp?tp=&arnumber=14770>; pp. 275-281.*

Guimaraes, Silva, "Improving Early Detection of Software Merge Conflicts", 2012 IEEE; [retrieved on Apr. 5, 2013]; Retrieved from Internet <URL:http://ieeexplore.ieee.org/stamp/stamp.jsp?tp=&arnumber=6227180>; pp. 342-352.*

"AccuRev 4.6 Software Configuration Management" Data Sheet, 2 pages. 2008.

"Software Configuration Management—SCM—from AccuRev" 1 page, retrieved from the World Wide Web on Mar. 12, 2008 http://accurev.com/.

"Google SVN Time-Lapse View", 6 pages, retrieved from World Wide Web on Mar. 10, 2008 http://code.google.com/p/svn-time-lapse-view/.

"Jon Aquino's Mental Garden", 5 pages, Oct. 16, 2007; retrieved from the World Wide Web on Mar. 10, 2008 http://jonaquino.blogspot.com/2007/1/sven-time-lapse-view.html.

"IBM Rational ClearCase" 4 pages, Mar. 2007 http://ibm.com/software/rational/offerings/scm.html.

"Rational ClearCase", 2 pages, retrieved from the World Wide Web on Mar. 12, 2008 http://www-306.ibm.com/software/awdtools/clearcase/.

"SmartSVN—Subversion/SVN Client: Highlights", 4 pages, retrieved from the World Wide Web on Mar. 11, 2008 http://www.syntevo.com/smartsvn/features.html.

"SmartSVN—the Easy-to-use Subversion Client" *SyntEvo GmbH..* 2 pages, 2005-2007 http://syntevo.com.

"The Coolest Interface to (Sub)Version Control" 4 pages, retrieved from the World Wide Web Mar. 12, 2008 http://tortoisesvn.net/.

"ViewVC: Repository Browsing", 2 pages, retrieved from World Wide Web on Mar. 12, 2008 http://viewvc.org/.

Office Action for U.S. Appl. No. 11/975,759, mailing date: Nov. 10, 2010.

From Wikipedia, the free encyclopedia, "Revision control" downloaded from http://web.archive.org/web/20060920043802/http://en.wikipedia.org/wiki/Revision_control (1 of 8) on Mar. 23, 2011 at 10:35:30 PM from web pages as of Sep. 13, 2006.

Horvath el al., "Adaptive Objects for Behavior Based Product Models," *IEEE*, vol. 1, pp. 651-656 (Jan. 10, 2006).

Purvis et al., "A Group Collaboration Tool for Software Engineering Products," *IEEE*, pp. 362-369 (Aug. 6, 2002).

* cited by examiner

| | | metrics6 | | | | | |
|---|---|---|---|---|---|---|---|
| ⇐ ⇒ ⇧ ⟲ ⬡ | /Volumes/Workspace/wcs/metrics6 | | | | | | ... |
| Name | | Size | Modified | Commited | Revision | Author | |
| ▷ ☐ .svn | | | 2007... | | | | |
| 🗋 bar.pl | | 57 | 2007... | 2007 / ... | 1224 | mwall | ⊚ ⊚ |
| ▷ 📁 blah | | | 2007... | 2007 / ... | 1252 | twall | ⊚ ⊚ |
| 🗋 foo.c | | 1... | 2007... | 2007 / ... | 1228 | acrum | ⊚ ⊚ |
| 🗋 foo2.c | | 52 | 2007... | 2007 / ... | 1227 | acrum | ⊚ ⊚ |
| 🗋 idems-asset-groups.xml | | 1... | 2007... | 2007 / ... | 1504 | aauc... | ⊚ ⊚ |
| 🗋 idems:asset-groups.xml | | 9... | 2007... | 2007 / ... | 1315 | mwall | ⊚ ⊚ |
| ▷ 📁 models | | | 2007... | 2007 / ... | 848 | mwall | ⊚ ⊚ |
| ▷ 📁 NewFolderX | | | 2007... | 2007 / ... | 854 | aauc... | ⊚ ⊚ |
| 🗋 publications.xml | | 9... | 2006... | 2006 / ... | 16 | repo... | ⊚ ⊚ |
| ▷ 📁 zzzzz | | | 2007... | 2007 / ... | 1476 | chom | ⊚ ⊚ |
| ↖32 | | | | | | 36⬈ 38⬈ | |

FIG. 5A

```
○ ○ ○         History: .dirids (778) at projects.oculustech.com
◁▾ ▷▾ ⌂ ⟳ ⬡  :ts.oculustech.com/oculus/repos/testing/blah/models/trunk/.dirids@778

Revision: 778
Author: mwall
Date: 1/30/07 6:02 PM
Message: import as project
A /blah/models/trunk
A /blah/models/trunk/Building Envelope/ .drids
A /blah/models/trunk/Air Circulation/ .drids
A /blah/models/trunk/ .ignore
A /blah/models/trunk/Air Circulation/Air Circulation
A /blah/models/trunk/Air Circulation
A /blah/models/trunk/ .dirids
A /blah/models/trunk/Building Envelope
A /blah/models/trunk/Building Envelope/Building Envelope
                        ↖ 34
```

COMPUTER METHOD AND APPARATUS FOR ENGINEERED PRODUCT MANAGEMENT INCLUDING SIMULTANEOUS INDICATION OF WORKING COPY STATUS AND REPOSITORY STATUS

RELATED APPLICATIONS

This application claims the benefit of U.S. Provisional Application No. 60/994,720, filed on Sep. 21, 2007. The entire teachings of the above application are incorporated herein by reference.

BACKGROUND OF THE INVENTION

Engineering is often a collaborative effort. For example, a software development project requires a team of designers, developers, testers, and management. Other engineering projects have similar teams of project members. Tools for supporting and managing the team include integrated development environments for individual activities as well as collaborative tools for communicating about and/or sharing data.

Attempts have been made to codify and/or standardize engineering processes. Examples in software development include the Unified Modeling Language (UML) and other visual modeling languages. Such visual modeling languages have formal syntax and symantics for communicating a model or conceptualization. In general, at the modeling level a "problem" is posed in terms of a customer's needs and requirements and may be referred to as the business problem system. The software designer develops a "solution" software product and/or services that address the problem. The visual modeling language syntax enables software designers to express (specify and document) the subject problems and solutions in a standardized manner, while the symantics enable knowledge about the subject problem system to be captured and leveraged during the problem solving phase. As such, the visual modeling language enables the sharing of information (including prior solution portions) and extension (without reimplementation) of core object oriented concepts (analysis and design) during the iterative problem-solving process for designing software products.

Attempts have been made to formalize the capture of artifacts used to create engineered products, whether the products are electromechanical systems or software applications. In many engineering environments, these systems are referred to as product data management (PDM) systems. In software development, these are often referred to as revision (or version) management systems. Typically these systems serve as a vault or storage system that captures changes to a product design over time.

Most revision management systems include the notions of a repository and a working copy. The repository is the vault in which all changes are recorded. The working copy is a snapshot of a specific state in time, copied to a work space in which an engineer can work on it. Typically a working (workspace) copy of a file (or asset in general) from the storage is shown with changes relative to the repository (stored) copy but not vice versa. "TortoiseSVN", an open source engineering tool, is an example.

SUMMARY OF THE INVENTION

The present invention addresses the disadvantages and concerns of the prior art. In particular the present invention provides a revision manager that produces in a common screen view indications of changes of a working copy of an asset relative to the repository copy, as well as indications of changes to the repository copy relative to the working copy.

In a preferred embodiment, a computer method and apparatus for managing revisions to engineered products includes a central data store (repository), local data store (working copy), and a revision manager (software program or processor routine/procedure to manage the repositories and working copies). Each engineered product is formed of one or more assets. The repository holds one or more assets and tracks changes to the assets. For a given asset, the revision manager provides, together in a certain screen view, to a user (a) indication of changes made to a working copy of the given asset relative to the given asset as held in the repository, and (b) indications of changes made to the given asset in the repository relative to the working copy.

The working copy of the given asset may be local to the user (e.g. on a local drive) or remote (e.g. on a network drive or server). The repository may be local to the user (e.g. on a local drive) or remote (e.g. on a network drive or server).

Indicators used in the certain screen view include any combination of symbols, graphics, text, indicia, color coding and the like. The indicators represent an asset as being marked for addition, marked for removal, having conflicts, having changes or containing items that have changes, having no changes, being missing, locked, unlocked or other states related to the revision management system. Other indicator representations are suitable. The various indicators that may be used to show the state of an asset in the working copy are also the set or pool of indicators used to show state of an asset in the repository.

In one embodiment, the certain screen view provides any combination of: textual description of changes made, textual summaries, ionic summary, color coded symbols, details of changes made in the repository including indication of who made the changes and time of change. The screen view presents the indications in a tabular format. The columns of the table may be sortable. In other embodiments, some portions of the screen view provide handles (hyperlinks) to the repository and/or working copy of assets.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 5A and 5B are illustrations of screen views generated by one embodiment of the invention revision manager.

DETAILED DESCRIPTION OF THE INVENTION

A description of example embodiments of the invention follows.

Figure 1:
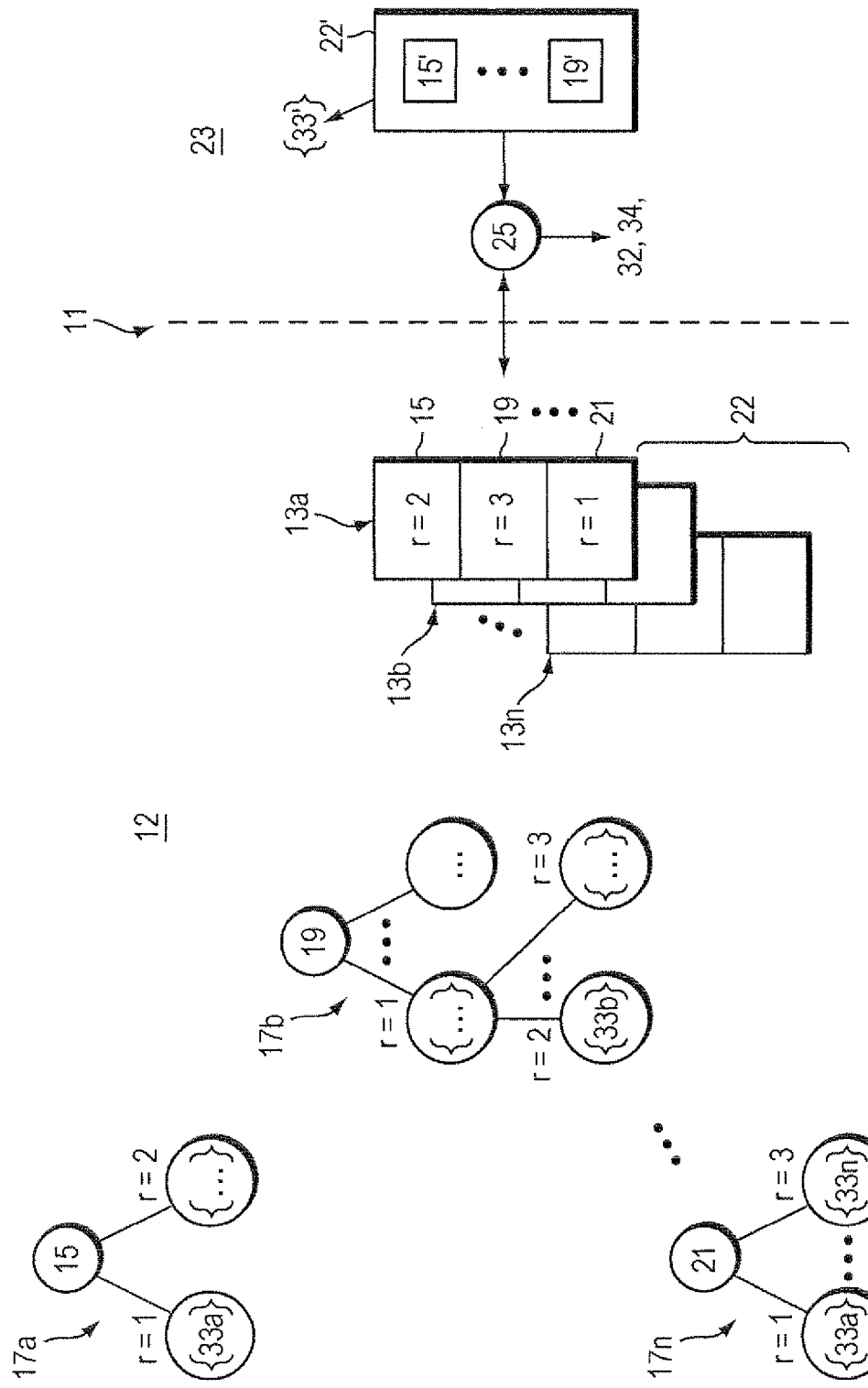
FIG. 1 is a schematic view of an engineering product management system employing a revision manager of the present invention.

Illustrated in FIG. 1 is an engineering product management system 11 embodying the present invention. One example is a software configuration management system but management systems of other engineering products are suitable. Engineering Product management system 11 provides a work space 23 view of a set of assets (generally engineered product) 13. This engineered product 13 is formed of one or more assets 15, 19, 21. Each asset 15, 19, 21 has respective versions or revisions, typically referenced by a revision number. Different sets 22 of assets forming the different versions 13a, b ... n of the engineered product 13 employ respective revisions of the assets 15, 19, 21. One of the illustrated versions (sets of assets 22) of engineered product referenced 13a in FIG. 1 is formed of revision r=2 of asset 15, revision r=3 of asset 19 and revision r=1 of asset 21. Other versions 22 of subject engineered product 13 use other revisions of assets 15, 19, 21.

Each version (set of assets) 22 of an engineered product 13 has a state. For a given state, every asset 15, 19, 21 in the set 22 has a location in space (repository 12 further described below) and in time defining the state. Representation of asset location in memory follows the format:

Protocol://[[username [:pw]@] host [:port]]/dir../asset [@r]

Where "Protocol" is for example http:
   https:
   svntssn:
   svn:
   or ftp:

Username [:pw] is an enduser login or system name and password, host [:port] is a local or remote server name and port number, /dir (first occurrence) is the root and parent (i.e., uppermost level directory) name, and /asset [@ r] is the name of the subject asset and revision number r.

Each asset 15, 19, 21 has a set of revision numbers r. Each revision number designates a specific state of the asset within the repository 12.

Common examples of assets are files and directories containing diagrams or drawings, engineering specifications, source code of a software program, requirements documentation, system models, system tests and so forth. A significant state of an asset is saved as a revision of that asset, and the sets of revisions (states) of a given asset are stored in a tree or similar searchable data structure 17. Asset revision trees 17 and assets 15, 19, 21 are held in a repository 12 illustrated to the left side of the dashed lines in FIG. 1. Thus, FIG. 1 illustrates an asset revision tree 17a for asset 15, asset revision tree 17b for asset 19 and asset revision tree 17n for asset 21.

When an engineer or collaboration team member makes changes to an asset 15, 19, 21, the set of changes 33 is recorded in respective asset revision tree 17. In particular, a change set 33 lists the modifications made to respective assets in one state to arrive at the next immediate state of the assets. A change set 33 may be as short as a listing of changes (one or more) made to one file (asset) or as expansive as respective listings of changes made to many assets. The asset revision trees 17 are maintained in this way for each version 22 of engineered product 13a, b, c.

Specifically, engineered product management system 11 enables users to produce and work with (edit, test, redesign, etc.) different configurations or versions 22 of subject engineered product 13. The engineering product management system 11 utilizes a revision manager 25 to manage the revisions made to each asset 15, 19, 21 and the resulting revised assets thereof. Changes to assets 15, 19, 21 are made in the context of workspace 23. The workspace 23 identifies the local changes (change set 33') currently being performed to a version 22' of engineered product 13 (its assets 15' and 19' for example) of that workspace. When the local changes 33' are completed and accepted or otherwise saved by the users, the revision manager 25 records in respective asset revision trees 17 the resulting new revised asset or asset revisions and the corresponding changes (change sets) 33a, b, ... n.

Further, during a user working with version 22' (i.e. its assets 15', 19'), the revision manager 25 provides indications of changes of the workspace 23 (working) copy of version 22'/assets 15', 19' relative to the repository 12 version of the version 22/assets 15, 19, as well as at the same time indicates changes to the version 22/assets 15, 19 as stored in repository 12 relative to the workspace 23 copy (i.e. version 22' and assets 15', 19') as heretofore unachieved in the prior art. This enables the user, while working with a version 22, to be informed of version changes made by other users and recently stored in repository 12.

Figure 2:
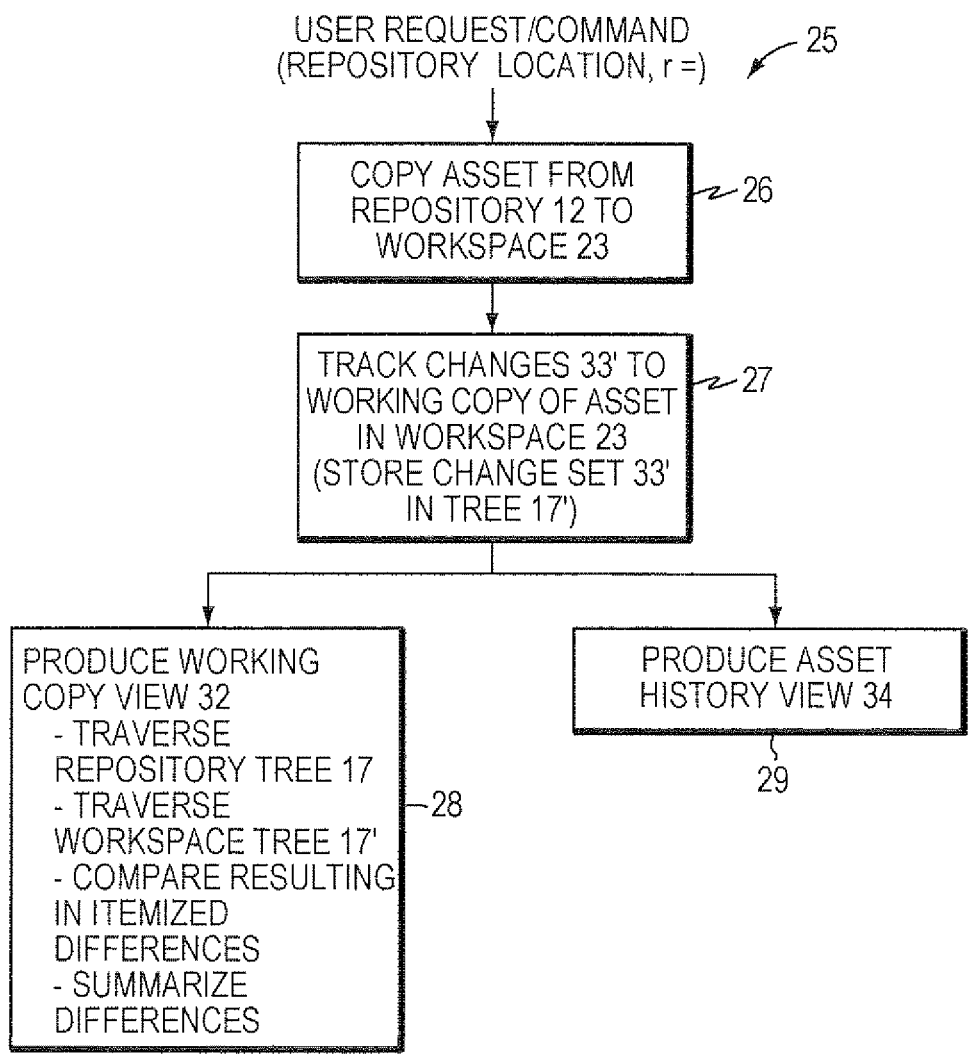
FIG. 2 is a flow diagram of one embodiment of the revision manager of the present invention.

FIG. 2 illustrates in more detail a preferred embodiment of the revision manager 25 of the present invention. Briefly by way of overview, the revision manager 25 operates as a tracking tool (tracking changes 33, 33' for assets 15, 19, 21 and hence revisions to assets) and provides two views in particular, namely, working copy view 32 and a file history view 34. With the working copy view 32, the revision manager 25 enables a user to view status information of an asset 15, 19, 21. For the subject asset, there is a working copy and a repository copy. The revision manager 25 establishes the working copy 15', 19' upon the user checking out the asset 15, 19, 21 from the repository 12 and placing the asset (a working copy 15', 19' thereof) on a drive supporting the user. In the working copy view 32, the revision manager shows the asset working copy 15', 19' relative to the corresponding repository copy 15, 19 and vice versa. This is accomplished using the cached or other stored collection of changes 33' to the working copy 15', 19' and the changes 33 associated with the repository copy 15, 19.

In a preferred embodiment, the revision manager 25 provides real time display of changes 33, 33' in both of these directions, i.e., relative to working copy and relative to repository copy. This is accomplished by traversing pertinent asset revision trees 17, 17' in a depth first manner. Other known tree traversal techniques are suitable.

With reference to FIG. 2, a user requests an asset or a set of assets 15, 19, 21 in repository 12. The user request specifies the repository location of the asset(s) following the asset location format described above. Where that format indicates a certain revision (by revision number), the state of the subject asset at the time of that revision is retrieved. If no revision number is indicated then the current revision of the asset is implied. Responsive to the user's request, revision manager 25 at step 26 makes a copy of the requested revision of subject asset(s) 15, 19, 21 from repository 12 and places the copy(ies) in the user workspace 23. Typically the workspace 23 is on a local drive of the user computer. The local copy of the subject asset revision is referred to as the working copy 15', 19' or workspace 23 copy of the asset. It is understood that repository 12 may be local or remote from the user computer and that workspace 23 may be local or remote. Any combination/permutation of local and/or remote workspace 23 and repository 12 is suitable.

As the user makes changes 33' to the working copy 15', 19' in workspace 23, revision manager 25 monitors and tallies these changes 33' (step 27). Revision manager 25 may accomplish this tracking of working copy asset changes 33' by utilizing lists, tables, tree structures 17', programming objects or other common data structures and known traversal techniques. In a preferred embodiment, data structures and traversal methods are designed or chosen with speed in mind so that real time display of working copy view 32 (FIG. 5A) by revision manager 25 is supported.

At step 28, revision manager 25 renders a working copy view 32 (FIG. 5A) showing indications of current changes 33' made to working copy 15', 19' of the subject asset relative to the corresponding repository copy 15, 19 of the asset (at the latest state or any other time/state in the repository 12) as well as showing indication of status of current repository 12 copy (and respective recorded changes 33a, b ... n) relative to the working copy 15', 19'. This is accomplished by traversing respective tree structures 17, 17' holding pertinent change sets 33, 33' and determining status of the asset at the subject moments in time. Displaying asset revisions/changes in both of these directions in one screen view assists users in managing assets (i.e., revisions thereof) and collaborating over configurations/versions 22 of engineered product 13.

FIG. 5A illustrates an example of working copy view 32 showing status of the working copies of various assets 15, 19, 21 in a tabular format. Names and types of the assets are indicated on the left hand side of the screen view. The names may be implemented as hyperlinks or other handles to the repository 12 copy or working copy of an asset.

Based on tallied local changes 33', working copy status indicators in column 36 indicate status of items in the workspace 23 relative to respective corresponding items in the repository 12. The indicators serve as summaries of the differences. Compare tools or Diff tools (e.g. in the software development art) or the like are utilized in step 28 to itemize the differences between state of items in the working copy 15', 19' and states of the corresponding items in repository 12.

Further from the gathered change set 33, 33' information and determined differences in state, working copy view 32 may provide summary details of asset changes, textual descriptions of asset changes and/or color coding of symbols and indicators and the like. Textual descriptions of asset changes made in the repository may include details of who made a change and at what time the change was made.

The preferred embodiment employs the following working copy status indicators:
  ⊕ Marked for addition
  ⊖ Marked for removal
  (!) Has conflicts
  ⊙ Has changes or contains items that have changes
  (✓) No changes
  @ Locked
  ⌀ Missing Along the right hand side of the screen view 32 are the repository status indicators 38. The repository status indicators 38 indicate the status of items in the repository 12 relative to the respective corresponding items in the workspace 23 and are based on recorded changes 33. The preferred embodiment repository status indicators include:
  ⊙ Has changes or contains items that have changes
  (✓) No change
  @ Locked Changes for purposes of the repository status indicators include adding or removing an asset from a container asset (e.g. a directory) in the repository, adding a non-container asset to the repository, eliminating a non container asset in one state in the repository and modifying (making a change) to a non container asset in the repository.

These two columns 36, 38 provide the invention display of asset revisions/changes in both directions (relative to repository copy and relative to working copy) which is not provided, especially together in a single view, by the prior art. Although working copy view 32 of FIG. 5A shows a tabular display other formats (and symbols) are suitable. Some embodiments provide sortable columns 36, 38 employing known techniques. Various coloring schemes and color coding may also be applied.

Returning to FIG. 2, at step 29 revision manager 25 renders file (asset) history view 34. As illustrated in FIG. 5B, the file history view 34 provides a listing of the changes 33 or log of the change messages of a single asset. Revision manager (step 29) traverses trees 17 to generate the contents and their sequence of file history view 34. It is understood that a tables list or other known data structure may be used to hold change 33 data in repository 12 and respective traversal techniques may support generation of file history view 34.

Figure 3:
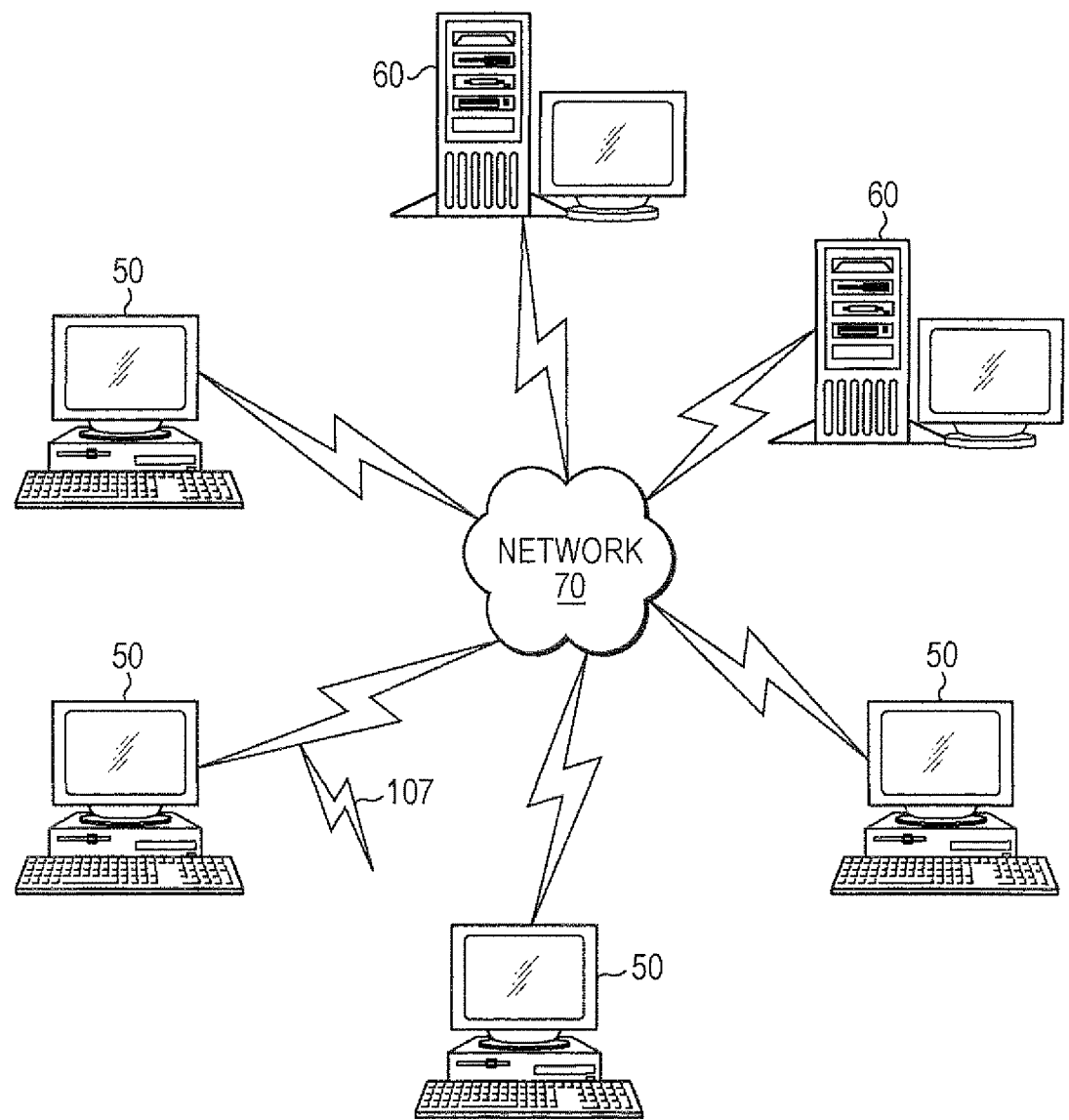
FIG. 3 is a schematic view of a computer network environment in which embodiments of the present invention are implemented.

FIG. 3 illustrates a computer network or similar digital processing environment in which the present invention may be implemented. The repository 12 may be on a server 60 or client 50 computer and the user workspace 23 may be on a client 50 or server 60 in the computer network. The repository 12 and user workspace 23 may be on a same/common client 50/server 60 or different computers. Parallel processors, distributed processors and other computer configurations and architectures are suitable.

Generally speaking, client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
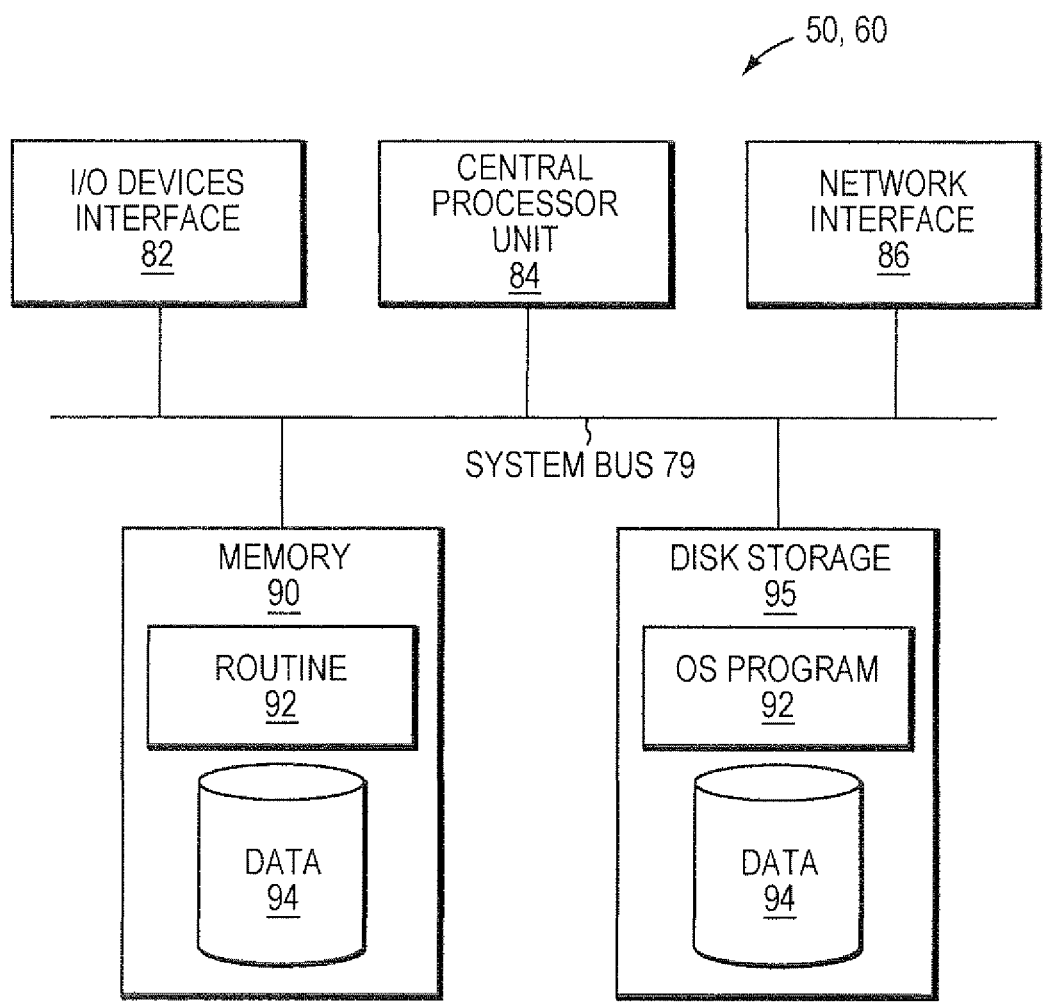
FIG. 4 is a block diagram of a node in the computer network of FIG. 3.

FIG. 4 is a diagram of the internal structure of a computer (e.g., client processor/device 50 or server computers 60) in the computer network of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., revision manager 25, repository 12, workspace 23 and process for generating screen views 32, 34 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 3 and 4 are for purposes of illustration and not limitation of the present invention.

Further, embodiments of the present invention may be implemented in hardware, software, firmware or any combination thereof. A computer system implementing the invention may be configured as a single or plural processors, parallel processors, client-server networked computers and other computer configurations.

What is claimed is:

1. A computer method for managing revisions to engineered products, comprising the steps of:
   holding in a data store at least one asset for forming an engineered product;
   tracking changes made to each asset in a workspace, there being a workspace copy of a subject asset and a data store copy of the subject asset; and
   automatically providing together, in a certain screen view, at least two separate indications of changes, one being indications of workspace copy changes and the other being indications of data store changes, such that:
   (a) the workspace copy of indications are configured to provide indications of changes made to the workspace copy of the subject asset relative to the data store copy of the subject asset, and
   (b) the data store copy of indications are configured to provide indications of changes made to the data store copy of the subject asset relative to the workspace copy of the subject asset, such that the (a) indications of the workspace copy changes are juxtaposed with the and (b) indications of data store copy changes in that they are positioned in close proximity to one another or positioned side by side one another in the certain screen view.

2. A method as claimed in claim 1 wherein the workspace copy of the subject asset is in a user workspace, and the user workspace is local or remote to a user and the data store is local or remote.

3. A method as claimed in claim 1 wherein the certain screen view provides any combination of:
   textual description of changes made,
   textual summaries,
   ionic summary,
   color coded symbols, and
   details of changes made in the repository including indication of who made the changes and time of change.

4. A method as claimed in claim 1 wherein the indications in the certain screen view include any one or combination of indicia representing:
   marked for addition,
   marked for removal,
   has conflicts,
   is locked,
   is missing,
   has changes or contains items that have changes, and
   no changes.

5. A method as claimed in claim 1 wherein the data store holds a plurality of assets of an engineered product, each asset having respective versions, different versions of assets forming different versions of the engineered product.

6. A method as claimed in claim 1 wherein the certain screen view that provides the indications of working copy changes together with the indications of data store changes is in a tabular format.

7. A method as claimed in claim 6 wherein the tabular format includes sortable columns.

8. Computer apparatus for managing revisions to engineered products, comprising:
   a data store in computer memory holding at least one asset for forming an engineered product;
   a revision manager executable by a processor tracking changes made to each asset;
   for a given asset, the revision manager configured to automatically provide together in a certain screen view to a user at least two separate indications of changes, one of the indications being working copy changes and the other indications being data store changes, such that:
   (a) the working copy indications are configured to provide indications of changes made to a working copy, of the user, of the given asset relative to the given asset as held in the data store, and
   (b) the data store indications are configured to provide indications of changes made by one or more other users to the given asset in the data store relative to the working copy, of the user, of the given asset, such that the (a) indications of the working copy changes are juxtaposed with the (b) indications of data store changes in that they are positioned in close proximity to one another or positioned side by side in the certain screen view.

9. Computer apparatus as claim in claim 8 wherein the working copy of the given asset is in a workspace of the user, and wherein the workspace is local or remote to the user and the data store is local or remote to the user.

10. Computer apparatus as claim in claim 8 wherein the certain screen view provides any combination of:
- textual description of changes made,
- textual summaries,
- ionic summary,
- color coded symbols, and
- details of changes made in the repository including indication of who made the changes and time of change.

11. Computer apparatus as claim in claim 8 wherein the indications in the certain screen view include any one or combination of indicia representing:
- marked for addition,
- marked for removal,
- has conflicts,
- is missing,
- is locked,
- has changes or contains items that have changes,
- no changes.

12. Computer apparatus as claim in claim 8 wherein the data store holds a plurality of assets of an engineered product, each asset having respective versions, different versions of assets forming different versions of the engineered product.

13. A computer apparatus as claimed in claim 8 wherein the certain screen view that provides the indications of working copy changes together with the indications of data store changes is in a tabular format.

14. A computer apparatus as claimed in claim 13 wherein the tabular format includes sortable columns.

15. A computer program product comprising:
- a non-transitory computer useable medium including a computer readable program for managing engineering revisions;
- wherein the computer readable program when executed by a computer causes:
- holding in a data store at least one asset for forming an engineered product;
- tracking changes made to each asset in a workspace, there being a workspace copy of a subject asset and a data store copy of the subject asset; and
- automatically displaying at least two separate indications of changes, one of the indications being workspace copy changes and the other indications being data store changes that are juxtaposed together to a user of the workspace: (a) the workspace copy indications are configured to provide indications of changes made to the workspace copy of the subject asset relative to the data store copy of the subject asset, and (b) the data store copy indications are configured to provide indications of changes made by another user to the data store copy of the subject asset relative to the workspace copy of the subject asset, such that the (a) indications of the workspace copy changes are juxtaposed with the and (b) indications of data store copy changes in that they are positioned in close proximity to one another or positioned side by side one another in the certain screen view.

16. A computer program product of claim 15 wherein the displaying together includes providing any combination of:
- textual description of changes made,
- textual summaries,
- ionic summary,
- color coded symbols,
- details of changes made in the repository including indication of who made the changes and time of change,
- tabular display of the indications, and
- sortable columns in the tabular display.

17. A computer program product of claim 15 wherein the indications include any one or combination of indicia representing:
- marked for addition,
- marked for removal,
- has conflicts,
- is locked,
- is missing,
- has changes or contains items that have changes, and
- no changes.

* * * * *